Jan. 8, 1963
J. A. AILEO
3,072,285
SURVIVAL KIT CONTAINER
Filed June 27, 1961
2 Sheets-Sheet 1
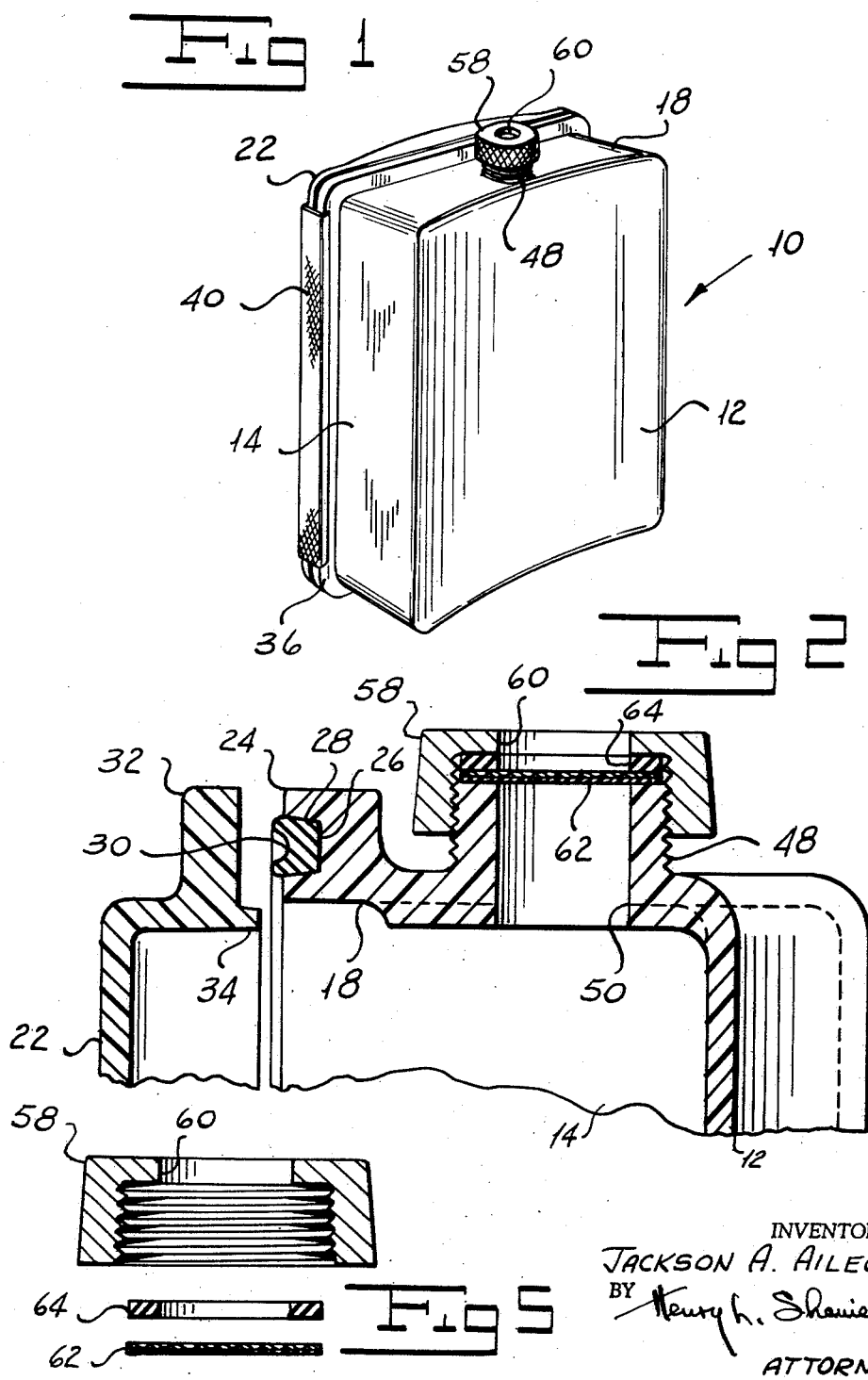
INVENTOR.
JACKSON A. AILEO
BY Henry L. Shenier
ATTORNEY Jan. 8, 1963
J. A. AILEO
3,072,285
SURVIVAL KIT CONTAINER
Filed June 27, 1961
2 Sheets-Sheet 2
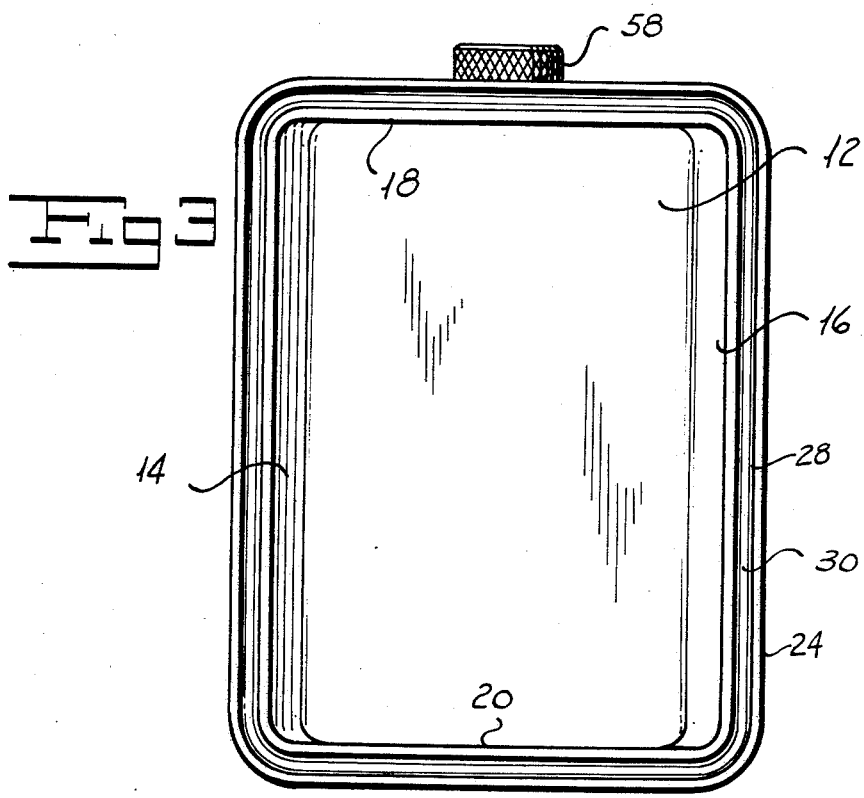
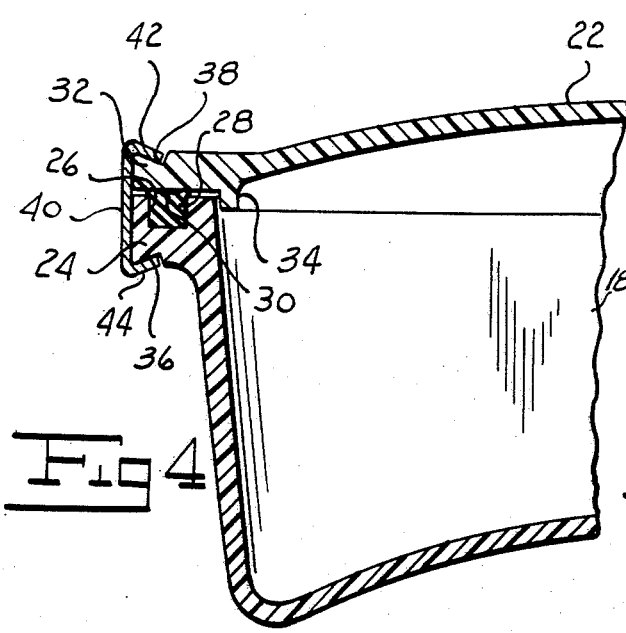
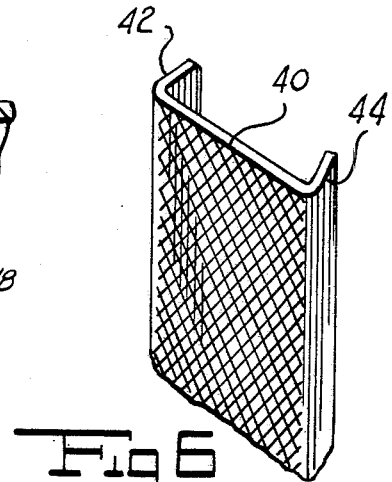
INVENTOR.
JACKSON A. AILEO
BY Henry L. Shenier
ATTORNEY 3,072,285
SURVIVAL KIT CONTAINER
Jackson A. Aileo, Carbondale, Pa., assignor to Gentex Corporation, Carbondale, Pa., a corporation of Delaware
Filed June 27, 1961, Ser. No. 119,950
3 Claims. (Cl. 220—44)

My invention relates to a survival kit container and more particularly to an improved watertight container which can be used over a wide range of ambient pressures and yet which is readily opened.

It is customary to provide the pilot of an aircraft with a survival kit including materials and articles which will permit him to survive in the event that he must abandon his aircraft. Very often the aircraft must be abandoned over the water so that the contents of the kit must be protected from damage by water in the event the container is immersed.

In modern aircraft adapted to fly at extremely high altitudes the pilot may be protected by a pressurized suit which permits him to survive at the very high altitudes in the event that he must bail out of the aircraft. The survival kit usually is carried in a pocket on the outside of the pilot's suit for example adjacent the pilot's thigh. One or more of the kits may be provided.

In use where the pilot is flying at extremely high altitudes, the kit container must be so designed that it will not burst or be deformed owing to the great range of pressures to which it is subjected. At the same time, the container must be made waterproof in the event that it becomes necessary for the pilot to abandon the aircraft when he is over water. A further requirement of a survival kit container is that it be able to be opened with relative ease even after having been subjected to a wide range of ambient pressures. It is desirable further that the container be strong and yet that it be sufficiently light so that it does not add appreciably to the weight which must be carried by the pilot and by the aircraft.

I have invented a survival kit container which successfully fulfills all the requirements outlined above. My container is waterproof. My container is so constructed that it is not damaged or deformed when subjected to a wide range of ambient pressures. I so construct my container that it can readily be opened under all circumstances even after having been subjected to a wide range of ambient pressures. While being readily opened, yet my container is effectively sealed against the entry of water into the interior thereof. My container is light and strong.

One object of my invention is to provide a survival kit container adapted for use over a wide range of ambient pressures.

A further object of my invention is to provide a survival kit container which is watertight.

Another object of my invention is to provide a survival kit container which can readily be opened even after being subjected to a very wide range of ambient pressures.

A still further object of my invention is to provide a survival kit container which is light and strong.

In general my invention contemplates the provision of a survival kit container including a molded plastic body having a lid adapted to fit over the body. Spring clips are adapted to slide over two edges of the cover and body to cause a U-shaped gasket between the cover and the body to provide an air tight seal. I provide the container body with an opening in which I dispose an air-permeable, liquid-impermeable seal which permits the equalization of pressure inside and outside the container while preventing the flow of liquid such as water into the interior of the container.

In the accompanying drawings which form part of the instant specification and which are to be read in conjunction therewith and in which like reference numerals are used to indicate like parts in the various views:

FIGURE 1 is a perspective view of my survival kit container.

FIGURE 2 is a sectional view of my survival kit container with the lid secured to the body and illustrating the air-permeable, water-impermeable seal.

FIGURE 3 is a top plan view of my survival kit container with the cover removed.

FIGURE 4 is a fragmentary sectional view of my survival kit container illustrating the manner in which the cover is sealed to the body.

FIGURE 5 is an exploded view illustrating the parts of the air-permeable, water-impermeable seal of my survival kit container.

FIGURE 6 is a fragmentary view of one of the clips I employ to hold the cover on the body with an airtight seal.

Referring now to the drawings, my survival kit container, indicated generally by the reference character 10, includes a body having a base 12, sides 14 and 16 and ends 18 and 20. Preferably I mold the body of my container from a suitable plastic material such, for example, as a polypropylene which, while having relatively high structural strength, is light enough so that its weight does not contribute appreciably to the weight which must be carried by the pilot and by the aircraft. I mold a cover 22 out of suitable material such, for example, as the same material of which the body is formed. It will be noted that the base 12 preferably is convex so that it conforms with the outer surface of the thigh of the pilot when placed in the pocket provided in the flier's suit. I form the body with a flange 24 extending around the entire periphery thereof. I form a groove or channel 26 in the flange 24 for the reception of a gasket 28. It will be noted for a reason to be explained hereinafter that the upper surface of the gasket 28 is U-shaped as indicated at 30 in the drawings.

The cover 22 has a peripheral lip 32 defined by a boss 34 adapted to fit within the container body. The flat under surface of lip 32 is adapted to engage the edges of the gasket 28.

I form each of the portions of the flange 24 extending along the sides 14 and 16 of the body with a groove 36 in the undersides thereof. The lip 32 has grooves 38 in its upper surface at corresponding locations.

My container is provided with a pair of spring clips 40 formed of a suitable material such as stainless steel and having a pair of inwardly extending legs 42 and 44. Preferably I knurl the outside surface of each of the locks to permit them to be operated with relative ease.

From the structure thus far described, it will be apparent that with the gasket 28 disposed in the groove 26 the cover 22 can be assembled on the body with the flat under surface of the lip 32 resting on the upper edge of the gasket. In response to a pressure applied to the cover and the body to squeeze them together, the gasket is compressed. With the gasket thus compressed, the slide locks 40 can readily be slid over the portions of the lip 32 and flange 24 along the sides 14 and 16 securely to hold the cover on the body. In this condition of the parts, gasket 28 provides an effective airtight seal between the cover 22 and the body. When the cover is to be removed from the body, the cover is squeezed down on the body to compress gasket 28 further to permit ready removal of the slide locks. It is to be noted that the concave upper surface 30 of the gasket facilitates this operation. That is, it provides a hermetic seal between the cover and the body while not requiring an excessively high force of compression to permit the spring locks to be removed.

I form the end 18 of the body with a fitting 48 provided with a bore or opening 50. A cap 58 provided with an opening 60 is threaded onto the fitting 48 to hold an air-permeable, water-impermeable seal 62 on the fitting 48. I dispose a washer 64 formed of a suitable material such as neoprene between the end of fitting 48 and the seal 62. While I have shown the fitting 48 as being formed integrally with the body of the container 10, it is to be understood that I may, if desired, use a separate fitting assembled in a suitable opening in the end 18 in any convenient manner.

The seal 62 may be made of any material which prevents the passage of liquid therethrough while permitting flow of gas. Patent No. 2,626,941, issued January 27, 1953, discloses various specific materials which can be used to form my seal 62. Any appropriate textile fabric such as those made from cotton, regenerated cellulose, cellulose acetate, linear polyamides, linear polyesters and glass may form the fabric base of my seal. Alternatively it is possible to use leather or paper for the base. In producing the seal various water insoluble coating materials such as natural or synthetic rubber or plastic are compounded with finely divided fillers such as calcium carbonate, calcium silicate and the like before being applied to the base in the manner described in the patent. Pages 42 to 44 of "Chemical and Engineering News," September 7, 1959, also describe the formation of microporous plastics suitable for use as my seal 62. In making the material the fabric base is coated to produce a microporous structure containing interconnected pores which are small enough to prevent the passage of liquid while being sufficiently numerous to permit the passage of gas at a relatively high rate. Any appropriate material having this property can be employed.

In making my survival kit container, I mold the body and the cover 22 from a suitable material such, for example, as polypropylene plastic. I then secure the seal 62 to the fitting 50 by screwing the cap 58 onto the fitting. The container is now ready for use. After having placed the required articles in the container, I place the cover 22 on the body and squeeze the two members together to compress the gasket 28. I then slide the two locks 40 over the portions of the lip 32 and flange 24 along the sides 14 and 16 with legs 42 and 44 in the slots 36 and 38 to cause the gasket 28 to provide a hermetic seal between the cover and the body.

In use of the kit as the pressure of the atmosphere outside the container varies, the seal 62 permits the flow of air into and out of the container to equalize the pressure inside and outside relatively rapidly so that the danger of the container being destroyed or deformed as a result of the pressure difference between the inside and the outside of the container is avoided. At the same time, if it becomes necessary for the pilot to abandon his aircraft over the water, the seal 62 prevents the flow of water into the interior of the container and thus preserves the articles therein against the harmful effects of immersion in water. When the container is to be opened, the pilot merely squeezes the top and the body together and slips the spring locks off the container and removes the cover 22.

It will be seen that I have accomplished the objects of my invention. I have provided a survival kit container which is especially adapted for use over a wide range of pressures. My container is protected against the harmful effects of pressure difference between the inside and the outside of the container. My container is waterproof. The construction is such that it may be opened and closed with relative ease. It is strong and light.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A container including in combination a boxlike body having a bottom and sides and an open top generally co-extensive in area with said bottom to permit articles to be deposited in said body, means forming a gasket recess around the periphery of said open top, a resilient gasket having a concave surface in its relaxed state, said gasket being disposed in said gasket recess with its concave surface facing out of the recess, a lid adapted to fit over said gasket to close said top, means comprising a clamp for securing said lid to said body to compress said gasket to provide a hermetic seal between the lid and the body to form an assembly of the lid and the body, means providing an opening having an area appreciably smaller than the area of said open top in said assembly, means comprising a microporous structure providing a water-impermeable gas-permeable seal and means mounting said seal in said opening to prevent passage of water into said body while permitting the passage of gas into and out of the assembly.

2. A container including in combination a boxlike body having a bottom and sides and an open top to permit articles to be deposited in said body, a peripheral flange extending around said open top, said flange being provided with a gasket recess, a resilient gasket having a concave surface in its relaxed state, said gasket being disposed in said recess with its concave surface facing out of said recess, a lid for said body adapted to fit over said open top, a flange on said lid adapted to fit over said gasket when said lid is in place on said body, means comprising a clamp engaging said body and lid flanges for compressing said gasket to provide a hermetic seal between said lid and body to form an assembly of said lid and body, means forming an opening having an area appreciably less than the area of said open top in said assembly, means comprising a microporous structure providing a water-impermeable gas-permeable seal and means mounting said seal in said opening to prevent passage of water into said body while permitting the passage of gas into and out of said assembly.

3. A container including in combination a boxlike body having a bottom and sides and an open top to permit articles to be deposited in said body, means forming a gasket recess around the periphery of said open top, a resilient gasket having a concave surface in its relaxed state, said gasket being disposed in said gasket recess with its concave surface facing out of the recess, a lid adapted to fit over said gasket to close said top, means comprising a clamp for securing said lid to said body to compress said gasket to provide a hermetic seal between the lid and the body to form an assembly of the lid and the body, means providing an opening having an area appreciably smaller than the area of said open top in said assembly, means comprising a microporous structure providing a water-impermeable gas-permeable seal and means mounting said seal in said opening to prevent passage of water into said body while permitting the passage of gas into and out of the assembly.

References Cited in the file of this patent

UNITED STATES PATENTS

| | | |
|---|---|---|
| 643,787 | Brochu | Feb. 22, 1900 |
| 1,268,064 | Johnson | May 28, 1918 |
| 1,476,300 | Larson | Dec. 4, 1923 |
| 1,624,461 | Barker | Apr. 2, 1927 |
| 1,940,601 | McCrery et al. | Dec. 19, 1933 |
| 2,298,938 | Griffin et al. | Oct. 13, 1942 |
| 2,330,220 | Kemper | Sept. 28, 1943 |
| 2,339,876 | Phillips | Jan. 25, 1944 |
| 2,394,333 | Schneider | Feb. 5, 1946 |
| 2,475,836 | Henricksen et al. | July 12, 1949 |
| 2,695,207 | Windsor | Nov. 23, 1954 |
| 2,756,893 | Barrere | July 31, 1956 |

FOREIGN PATENTS

| | | |
|---|---|---|
| 812,009 | Great Britain | Apr. 15, 1959 |
| 805,609 | France | Aug. 31, 1936 |
| 106,938 | Sweden | Mar. 23, 1943 |